US011272673B2

(12) United States Patent
Provaznik

(10) Patent No.: US 11,272,673 B2
(45) Date of Patent: Mar. 15, 2022

(54) IRRIGATION SYSTEM WITH HEIGHT-ADJUSTING SYSTEM FOR ADJUSTING TOWER HEIGHT

(71) Applicant: Lindsay Corporation, Omaha, NE (US)

(72) Inventor: Richard Edward Provaznik, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 150 days.

(21) Appl. No.: 16/272,531

(22) Filed: Feb. 11, 2019

(65) Prior Publication Data

US 2020/0253139 A1 Aug. 13, 2020

(51) Int. Cl.
*A01G 25/09* (2006.01)
*A01G 25/16* (2006.01)

(52) U.S. Cl.
CPC ........... *A01G 25/092* (2013.01); *A01G 25/16* (2013.01)

(58) Field of Classification Search
CPC ...... A01G 25/09; A01G 25/092; A01G 25/16; A01B 51/02
USPC ................................ 239/728–731, 739, 740
See application file for complete search history.

(56) References Cited

U.S. PATENT DOCUMENTS

| | | | | |
|---|---|---|---|---|
| 3,121,535 A | * | 2/1964 | Schneider | A01G 25/092 239/155 |
| RE26,285 E | * | 10/1967 | Stafford | A01G 25/09 239/735 |
| 3,463,175 A | * | 8/1969 | Rogers | A01G 25/097 239/1 |
| 3,519,206 A | * | 7/1970 | Leaders | A01G 25/09 239/735 |
| 3,856,038 A | * | 12/1974 | Paul | A01G 25/092 239/728 |
| 3,917,171 A | * | 11/1975 | Reinke | B62M 29/02 239/728 |
| 4,036,436 A | * | 7/1977 | Standal | A01G 25/097 239/733 |
| 4,467,962 A | * | 8/1984 | Noble | A01G 25/097 239/1 |
| 4,609,147 A | * | 9/1986 | Chapman | B05B 3/18 239/735 |
| 4,683,969 A | * | 8/1987 | Littau | B62D 55/06 180/6.48 |

(Continued)

*Primary Examiner* — Joseph A Greenlund
(74) *Attorney, Agent, or Firm* — Hovey Williams LLP

(57) ABSTRACT

An irrigation system comprising a fluid-carrying conduit, two or more spaced-apart mobile towers, and a height-adjusting system. The two or more spaced-apart mobile towers are configured to support and move the conduit above a field. Each mobile tower includes a pair of legs, wheels, and a motor. Each leg has a first end coupled with the fluid-carrying conduit via a swivel connection and a second end. One of the wheels is connected to each of the second ends of the legs. The motor is for driving at least one of the wheels. The height-adjusting system is configured to move the second ends of the legs of each mobile tower relative to one another to raise or lower the irrigation system. The height-adjusting system may include an expansion mechanism for permitting adjustments to the height of the irrigation system or for applying a force to help make the adjustments.

6 Claims, 10 Drawing Sheets

(56) References Cited

U.S. PATENT DOCUMENTS

| | | | | |
|---|---|---|---|---|
| 5,779,163 A * | 7/1998 | Gunter | ................. | A01G 25/092 239/728 |
| 6,431,475 B1 * | 8/2002 | Williams | ............... | A01G 25/09 239/740 |
| 6,805,311 B2 * | 10/2004 | Buller | .................... | A01G 25/09 180/9.1 |
| 7,182,275 B1 | 2/2007 | Wang | | |
| 7,568,675 B2 | 8/2009 | Catton | | |
| 7,938,343 B2 * | 5/2011 | Vorderstrasse | ....... | A01G 25/092 239/744 |
| 8,919,735 B2 | 12/2014 | Rosenboom et al. | | |
| 9,301,459 B1 * | 4/2016 | Williams | ............. | A01G 25/092 |
| 9,617,130 B2 | 4/2017 | Crumpler, Jr. | | |
| 9,743,596 B1 * | 8/2017 | Prandi | .................... | A01B 51/02 |
| 9,974,245 B2 | 5/2018 | Parod et al. | | |
| 10,257,989 B2 * | 4/2019 | Anderson | ............ | A01G 25/092 |
| 10,477,784 B1 * | 11/2019 | Williams | ............. | A01G 25/092 |
| 2011/0017850 A1 * | 1/2011 | Waybright | ........... | A01G 25/092 239/728 |
| 2015/0121770 A1 * | 5/2015 | Korus | ................. | A01G 25/092 52/1 |
| 2017/0251589 A1 * | 9/2017 | Tippery | .................. | A01B 5/16 |
| 2020/0253139 A1 * | 8/2020 | Provaznik | ............ | A01G 25/092 |

\* cited by examiner

IRRIGATION SYSTEM WITH HEIGHT-ADJUSTING SYSTEM FOR ADJUSTING TOWER HEIGHT

BACKGROUND

Irrigation systems, such as linear and center-pivot irrigation systems, include elevated water conduits supported by mobile towers. The elevated water conduits are connected to sprinklers or other fluid emitters. The mobile towers are configured to travel across a field as water flows through the conduits and is applied to crops in the field via the fluid emitters.

The towers must be tall enough so that the conduits can travel above the crops in the field to avoid damaging them. Because the water conduits must be supported above crops at their tallest heights, there is typically a large distance between the fluid emitters and younger crops or crops having a shorter height at maturity. The large distance between the fluid emitters and crops results in inefficient water application because wind, heat, and low humidity evaporate a substantial portion of the water before it reaches the shorter crops.

One solution to these problems is to use sprinkler drops. Sprinkler drops are elongated tubes that connect to the conduits and extend downwardly closer to the crops. Sprayer heads or other fluid emitters attach to the lower end of the sprinkler drops to deliver water closer to the crops. However, the sprinkler drops must be adjusted as the crops grow or when an irrigation system is used for different crops having various heights, and such adjustments are difficult and time-consuming.

Another problem with supporting heavy, water-laden conduits from tall mobile towers is it causes a high center of gravity such that the irrigation systems are prone to tipping over or other damage when exposed to high winds and when moved over hills and valleys.

The background discussion is intended to provide information related to the present invention which is not necessarily prior art.

SUMMARY

The present invention solves the above-described problems and other problems by providing an irrigation system having a height-adjusting system configured to raise or lower the irrigation system so as to accommodate crops of various heights and so as to selectively lower its center of gravity during storms and while traversing hills and valleys.

An irrigation system constructed in accordance with an embodiment of the present invention broadly comprises a fluid-carrying conduit, two or more spaced-apart mobile towers, and a height-adjusting system for raising or lowering the irrigation system. The mobile towers are configured to support and move the conduit and other components of the irrigation system over a field. Each mobile tower comprises a pair of legs, a wheel on each leg, and a motor for driving at least one of the wheels. Each leg has a first end coupled with the fluid-carrying conduit and a second end. The wheels are connected to the second ends of the legs.

The height-adjusting system is configured to move the second ends of the legs of each mobile tower relative to one another to raise or lower the irrigation system. Specifically, the second ends of each mobile tower are moved close to one another to raise the irrigation system and moved away from one another to lower the irrigation system.

In another aspect, a method of adjusting a height of an irrigation system broadly comprises determining a height adjustment of the irrigation system is warranted; moving lower ends of legs of each mobile tower of the irrigation system apart so as to lower the irrigation system when the determining step determines a lower height is warranted; and moving the lower ends of the legs of each of the mobile towers of the irrigation system toward one another so as to raise the irrigation system when the determining step determines a higher height is warranted.

In another aspect, the above-described irrigation system also comprises a control system for controlling the height-adjusting system. The control system may include a user interface, a data feed device, and a processing element. The user interface is configured to receive commands to raise or lower the irrigation system. The data feed device is configured to receive data representative of at least one of a wind speed, an air temperature, a crop temperature, GPS coordinates of the irrigation system, a vertical distance from the irrigation system to the field, a vertical distance from the irrigation system to a crop, a weather forecast, and a humidity level. The processing element is in communication with the data feed device and the user interface and is configured to receive the commands to raise or lower the irrigation system from the user interface, receive the data from the data feed device, analyze the data, and direct the motors to move the legs of each mobile tower relative to one another to raise or lower the irrigation system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
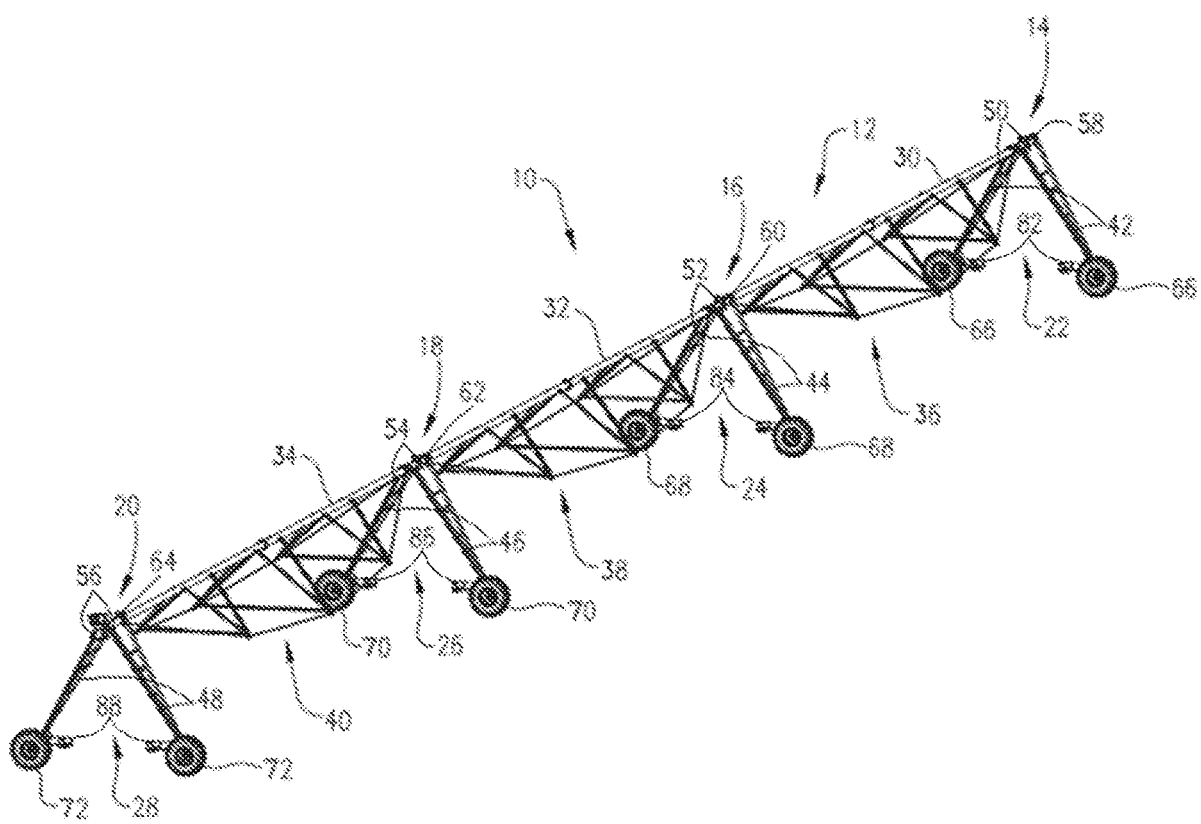
FIG. 1 is a perspective view of an exemplary irrigation system including height-adjusting systems constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, an irrigation system 10 constructed in accordance with a first embodiment of the invention is illustrated. The illustrated irrigation system 10 may be a central pivot irrigation system, a linear irrigation system, or any other irrigation system known in the art. The irrigation system 10 may have access to a well, water tank, or other source of water and may also be coupled with a tank or other source of agricultural products to inject fertilizers, pesticides and/or other chemicals into the water for application during irrigation.

The irrigation system 10 may comprise a fluid-carrying conduit 12 connected to the source of water, a number of spaced-apart mobile towers 14, 16, 18, 20 configured to support and move the conduit 12 above a field, and a height-adjusting system 22, 24, 26, 28 on each mobile tower 14, 16, 18, 20.

The conduit 12 may be supported by truss sections 30, 32, 34 or other supports to form a number of interconnected spans. Each of the truss sections 30, 32, 34 may carry or otherwise support a fluid emitter 36, 38, 40 that is in fluid communication with the conduit 12. The fluid emitters 36, 38, 40 may include a plurality of sprayer heads, sprinkler drops, spray guns, drop nozzles, valves, and/or other devices and are spaced along the truss sections 30, 32, 34 to apply water and/or other fluids to an area beneath the irrigation system 10.

Each mobile tower 14, 16, 18, 20 may include a pair of legs 42, 44, 46, 48, and each leg 42, 44, 46, 48 may have a first end 50, 52, 54, 56 coupled with the conduit 12 via a swivel connection 58, 60, 62, 64, as discussed in further detail below. Each mobile tower 14, 16, 18, 20 may also include a wheel 66, 68, 70, 72 connected to a second end 74, 76, 78, 80 of each leg 42, 44, 46, 48. As shown in FIG. 1, each of the wheels 66, 68, 70, 72 may be driven by a motor 82, 84, 86, 88. In some embodiments, the motors 82, 84, 86, 88 may be configured to drive a single wheel 66, 68, 70, 72 on its respective mobile tower 14, 16, 18, 20, wherein the wheels 66, 68, 70, 72 not driven by motors 82, 84, 86, 88 on each mobile tower 14, 16, 18, 20 are free-rotating wheels. In some embodiments, the motors 82, 84, 86, 88 may include a wheel drive gearbox 83 (shown in FIG. 2) for transferring power from the motors 82, 84, 86, 88 to the wheels 66, 68, 70, 72.

Figure 2:
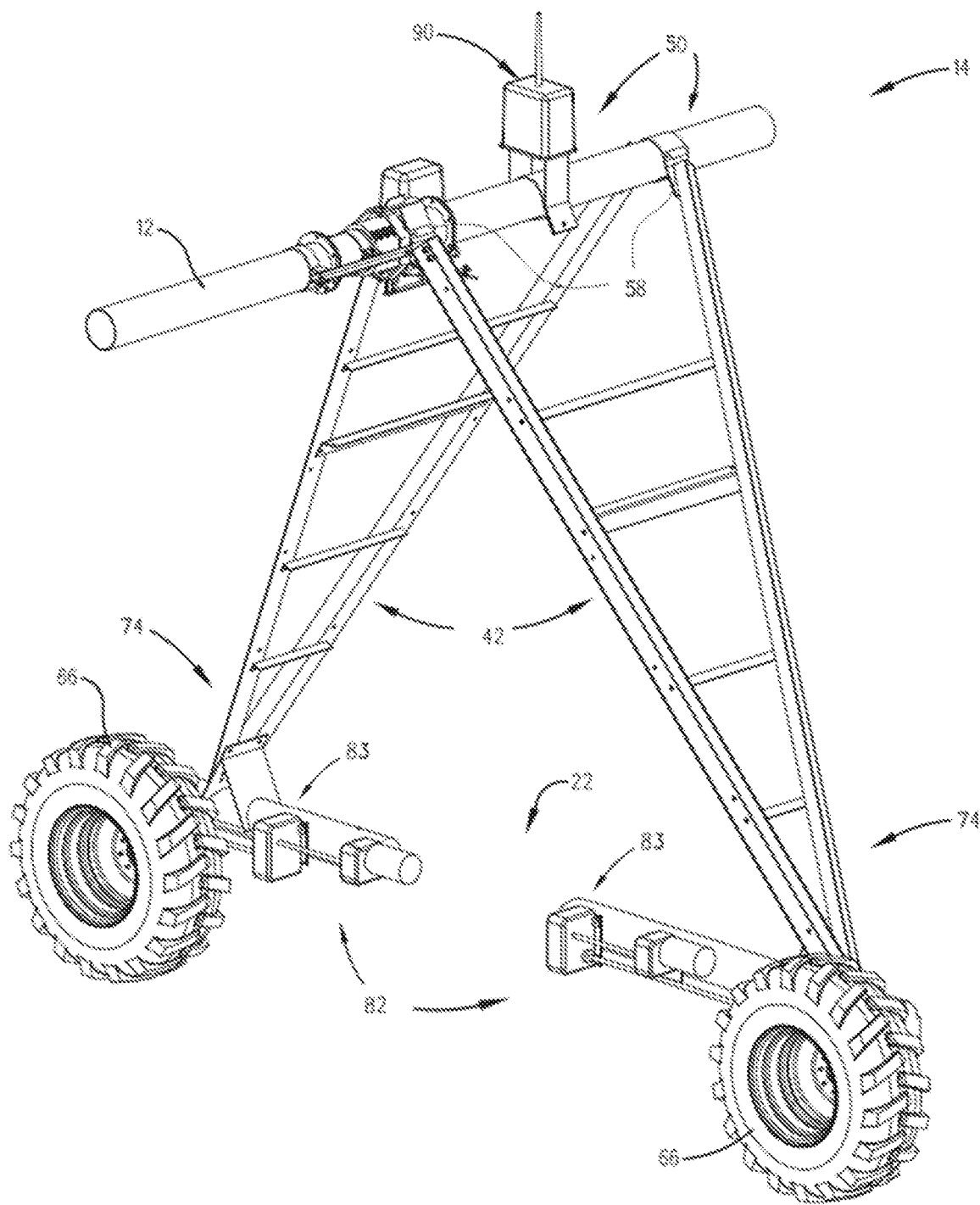
FIG. 2 is a front side perspective view of a mobile tower of the irrigation system having one of the height-adjusting systems of FIG. 1.

The height-adjusting systems 22, 24, 26, 28 may broadly include the swivel connections 58, 60, 62, 64 and a control system 90 (shown in FIG. 2). The swivel connections 58, 60, 62, 64 may be any mechanism configured to mechanically connect the first ends 50, 52, 54, 56 of the legs 42, 44, 46, 48 to the conduit 12 and enable angular movement of the legs 42, 44, 46, 48 relative to one another. The swivel connections 58, 60, 62, 64 may be hinges, joints, swivels, pin-connectors, or the like.

Figure 3:
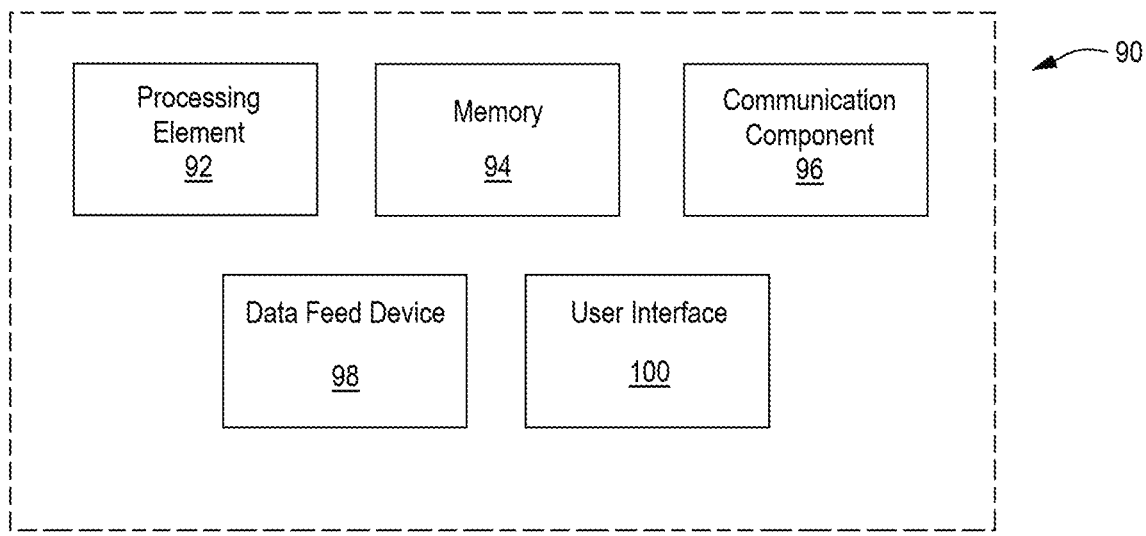
FIG. 3 is a block diagram of a control system constructed in accordance with an embodiment of the invention.

One of the mobile towers 14 and one of the height-adjusting systems 22 are shown in more detail in FIG. 2. The height-adjusting system 22 may broadly include a swivel connection 58 and a control system 90. The control system 90 is for operating the motors 82 to move the legs 42 relative to one another and may be in communication with the motors 82 of the mobile tower 14. One embodiment of the control system 90 may include a processing element 92, memory 94, a communication component 96, a data feed device 98, and a user interface 100 (as depicted in FIG. 3).

The processing element 92 may run a computer program stored in or on computer-readable medium residing on the memory 94 or otherwise accessible by the control system 90. The computer program may preferably comprise ordered listings of executable instructions for implementing logical functions by the processing element 92. The computer program may be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device.

The computer-readable medium can be, for example, but is not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random-access memory (RAM), a read-only memory (ROM), an erasable, programmable, read-only memory (EPROM or Flash memory), an optical fiber, and a portable compact disk read-only memory (CDROM). The computer-readable medium may be one or more components incorporated into the control system 90 and/or other computing devices.

The memory 94 of the control system 90 may include, for example, removable and non-removable memory elements such as RAM, ROM, flash, magnetic, optical, USB memory devices, and/or other conventional memory elements. The memory 94 may store various data associated with the control system 90, such as the computer program and code segments mentioned above, or other data for instructing the motors 82 to perform the steps described herein. Further, the memory 94 may store data retrieved from the data feed device 98, and/or remote computing and memory devices.

The communication component 96 may be a GPS unit, a communication device configured to receive a weather forecast and/or other data, and/or a communication device that receives control signals from the user interface 100. The communication component 96 may be a wired or wireless transceiver that communicates with other devices, systems, or networks. The communication component 96 may include signal or data transmitting and receiving circuits, such as antennas, transceivers, amplifiers, filters, mixers, oscillators, digital signal processors (DSPs), and the like. The communication component 96 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth®, or combinations thereof. Alternatively, or in addition, the communication component 96 may establish communication through connectors or couplers that receive metal conductor wires or cables which are compatible with networking technologies such as ethernet. In certain embodiments, the communication component 96 may also couple with optical fiber cables. The communication component 96 may be in communication with or electronically coupled to memory 94 and/or processing element 92.

The data feed device 98 communicates with the processing element 92 and be any device known in the art for receiving, detecting, and/or transmitting data. The data may be representative of environmental information including a wind speed, an air temperature, a crop temperature, GPS coordinates of the irrigation system, a vertical distance from the irrigation system to the field, a vertical distance from the irrigation system to a crop, a weather forecast, a slope of the ground, and a humidity level. The data feed device 98 may include a sensor such as a distance-monitoring device that monitors a distance between two points, a humidity sensor that measures a humidity level of air, a wind sensor that measures wind speed, a temperature sensor that measures a temperature of the air and/or an object, an accelerometer used to track an orientation of the irrigation system 10 to determine a slope of the ground, and the like. The sensors may be on-board, or attached to the irrigation system 10, or at a remote location, such as at a tower, building, house, etc.

The user interface 100 communicates with the processing element 92 and be a remote user interface, such as a computer and/or smart phone application, or it may be part of a control panel of the irrigation system 10. The user interface 100 may generally allow the user to utilize inputs and outputs to interact with the control system 90. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, printers, or the like, or combinations thereof. With the user interface 100, the user may be able to control the features and operation of the irrigation system 10.

Figure 4:
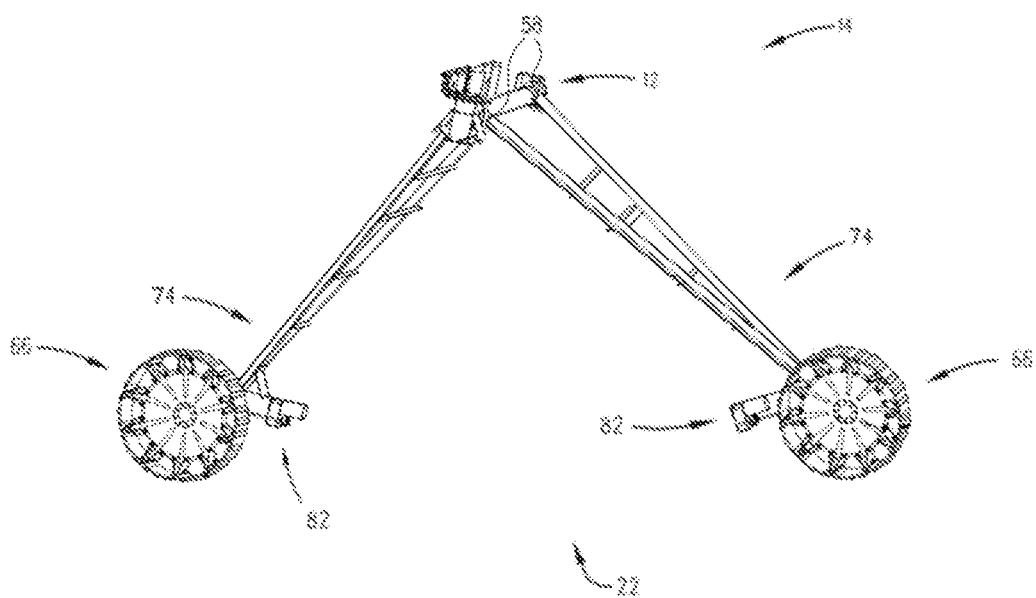
FIG. 4 is a front side perspective view of the mobile tower of FIG. 2, with its height lowered.
Figure 5:
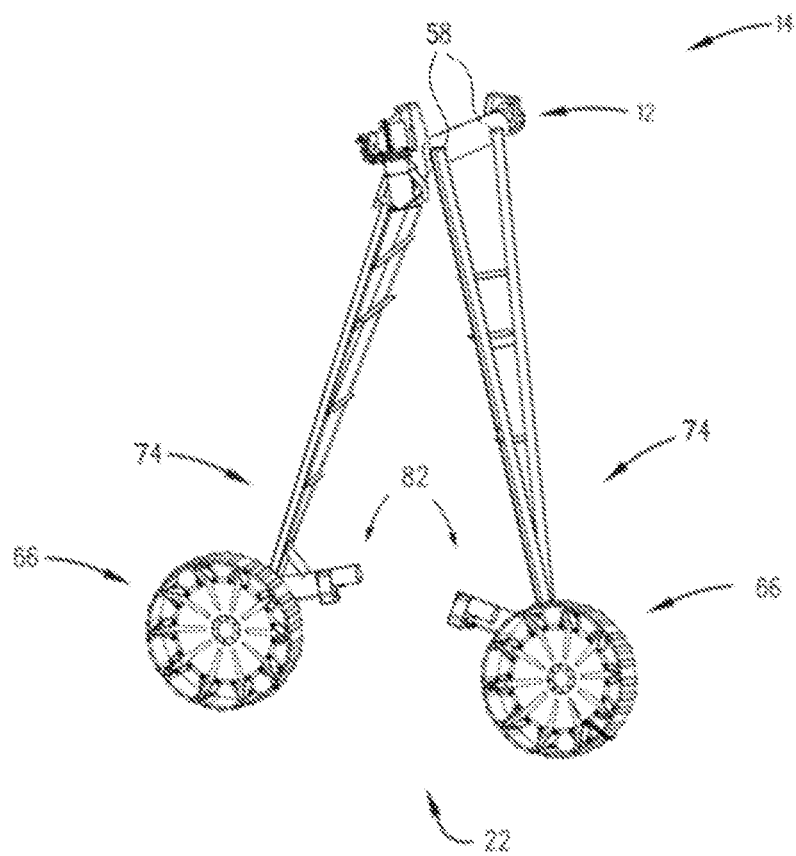
FIG. 5 is a front side perspective view of the mobile tower of FIG. 2, with its height raised.

The processing element 92 is configured to direct the motors 82 upon determining that a height adjustment of the irrigation system 10 is warranted. The processing element 92 may be configured to direct the motors 82 to drive the wheels 66 so that they move away from one another in order to lower a height of the irrigation system 10, as shown in FIG. 4. To raise the height of the irrigation system 10, the processing element 92 may be configured to direct the motors 82 to drive the wheels 66 so that they move closer to one another, as shown in FIG. 5. The processing element 92 may be configured to direct only one of the motors 82 to drive its corresponding wheel 66 while the other wheel 66 remains in the same spot.

The processing element 92 may be configured to determine the height adjustment is warranted based on data received from the data feed device 98. The data that the processing element 92 receives may include a distance between two points, such as a distance between the irrigation system 10, or a part thereof, and the ground or a crop. The data may also be a wind speed, a temperature of the air or a crop, GPS coordinates, a weather forecast, control signals, a type of crop, and/or other data.

The processing element 92 may also be configured to determine a magnitude of the height adjustment required, or a desired height of the irrigation system 10, based on the received data. The processing element 92 may be configured to determine a height of the irrigation system 10 any number of ways without departing from the scope of the present invention, including monitoring an angle between the legs 42 of the tower 14, a distance between a point on the irrigation system 10 and the ground, a distance between a point on one of the legs 42 of the tower 14 and a point on the other leg 42, tracking a distance traveled between wheels 66, etc.

In use, the processing element 92 may receive data from the data feed device 98. The processing element 92 may be configured to analyze the data to determine a height adjustment is warranted. For example, the processing element 92 may determine a height adjustment is warranted based on a control signal from the user interface 100. The control signal is triggered by a user directing the irrigation system 10 to be raised or lowered. The control signal may include a desired height for the irrigation system 10.

The processing element 92 may determine a height adjustment is warranted based on a weather forecast that is indicative of high winds and/or lightening. The weather forecast may include the current and/or future weather. The processing element 92 may determine a height adjustment is warranted based on a detected windspeed exceeding a threshold. If the processing element 92 determines a presence of lightening and/or high wind speeds, the processing element 92 may direct the lowering of the irrigation system 10. By lowering the irrigation system 10 via moving the wheels 66 apart, the mobile tower 14 has a lower center of gravity and wider base. When all the mobile towers do this, the entire irrigation system 10 also has a lower center of gravity and wider base. This improves the stability of the irrigation system 10, makes it more able to endure high wind speeds, and prevents and/or reduces damage. The processing element 92 may determine a height adjustment is warranted based on high windspeeds and/or lightening no longer being present. For example, the irrigation system 10 may be returned to its original height or set to a different height based on the data.

The processing element 92 may determine a height adjustment is warranted based on a detection of a slope of the ground. The irrigation system 10 may be lowered to increase stability when traversing a slope, such as a hill or valley.

The processing element 92 may determine a height adjustment is warranted based on a distance to the ground and/or a crop. For example, the processing element 92 may determine the irrigation system 10 is in or near a portion of a field having a crop with a certain height based on GPS coordinates of the irrigation system 10. Additionally or alternatively, the processing element 92 may determine a height adjustment is warranted based on a measured distance from the irrigation system 10 to a crop using the distance-monitoring device. In either case, if the distance to crops is too great or too small, the control system 90 may be configured to adjust the height to a desired distance. This enables the irrigation system 10 to water a portion of a field with crops having a different height. Further, it enables irrigation system 10 to be adjusted in height as crops grow.

The processing element 92 may determine a height adjustment is warranted based on an evaporation rate. The processing element 92 may be configured to determine a likelihood of evaporation accounting for wind speed, humidity, temperature, weather forecast, and/or the like. For example, if one and/or a combination of the aforementioned achieve a certain threshold, then the irrigation system 10 may be lowered so that water is applied more directly to the crops and/or soil in order to reduce evaporation.

Figure 6:
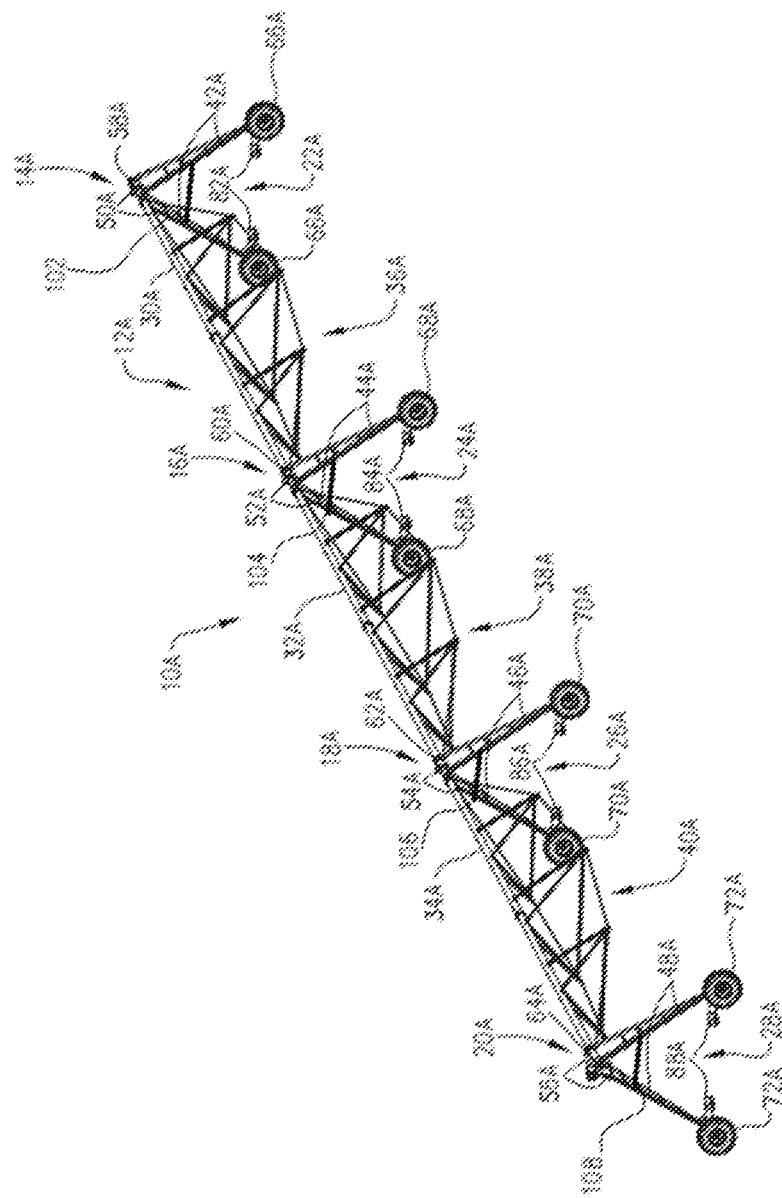
FIG. 6 is a front side perspective view of an irrigation system with a height-adjusting system constructed in accordance with another embodiment of the invention.
Figure 7:
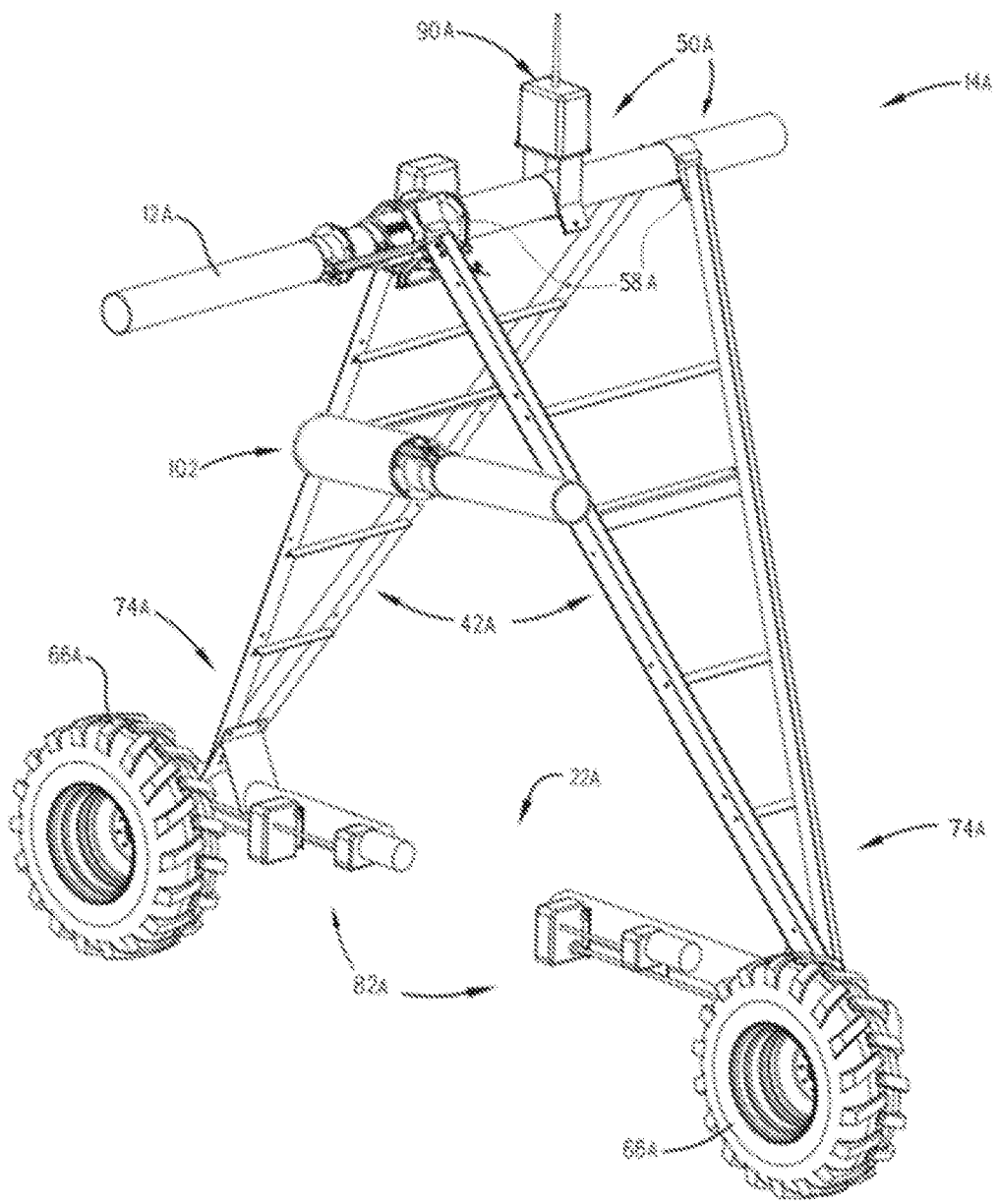
FIG. 7 is a front side perspective view of a mobile tower of the irrigation system of FIG. 6.

An irrigation system 10A constructed in accordance with another embodiment of the invention is shown in FIGS. 6 and 7. The irrigation system 10A may comprise substantially similar components as irrigation system 10; thus, the components of irrigation system 10A that correspond to similar components in irrigation system 10 have an 'A' appended to their reference numerals.

Figure 8:
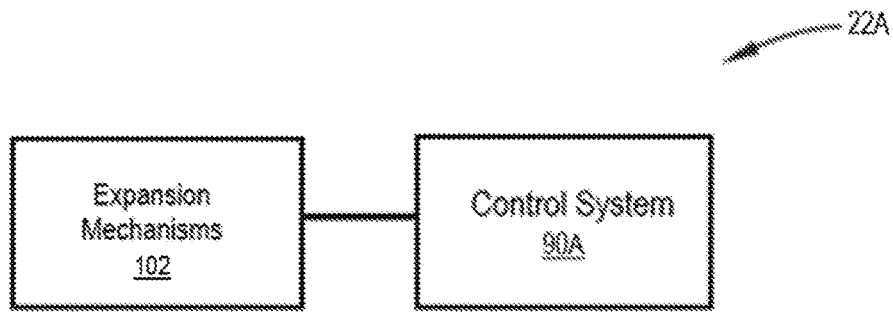
FIG. 8 is a block diagram of the height-adjusting system of FIG. 6.
Figure 9:
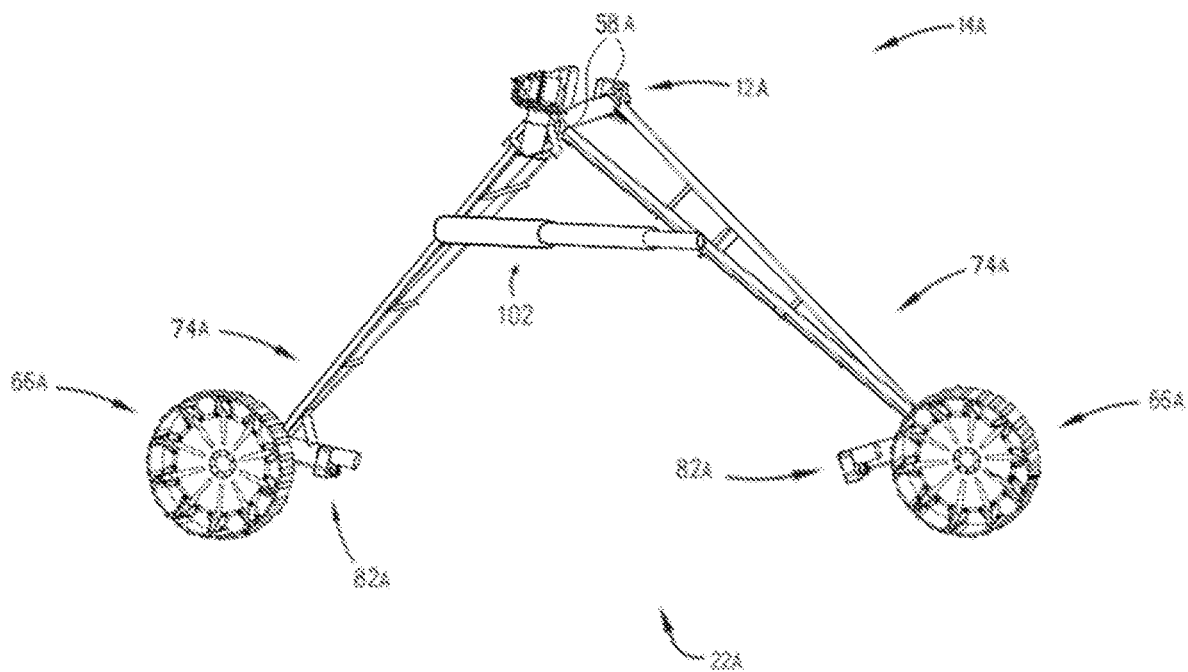
FIG. 9 is a front side perspective view of the mobile tower of FIG. 7, with its height lowered.
Figure 10:
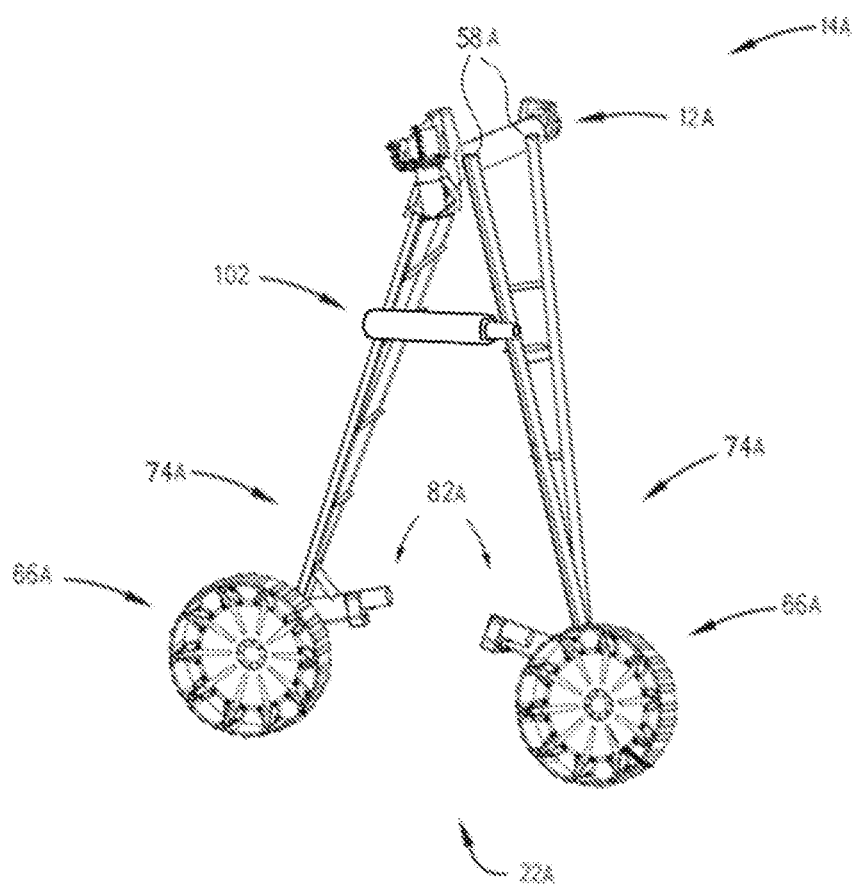
FIG. 10 is a front side perspective view of the mobile tower of FIG. 7, with its height raised.

The height-adjustment system 22A, 24A, 26A, 28A of irrigation system 10A may include expansion mechanisms 102, 104, 106, 108. The expansion mechanisms 102, 104, 106, 108 may be connected to and extending between the pair of legs 42A, 44A, 46A, 48A of each tower 14A, 16A, 18A, 20A. The expansion mechanisms 102, 104, 106, 108 may be in wired or wireless communication with the control system 90A, as represented in FIG. 8. The control system 90A, the motors 82A, 84A, 86A, 88A, and the expansion mechanisms 102, 104, 106, 108 may be configured to cooperatively adjust the height of the irrigation system 10A. The expansion mechanisms 102, 104, 106, 108 may be configured to merely permit movement in one or both directions (expansion and/or contraction). Additionally or alternatively, the expansion mechanisms 102, 104, 106, 108 may be configured to apply a force in one or both directions. Expansion of the expansion mechanisms 102, 104, 106, 108 causes the irrigation system 10A to lower, as shown in FIG. 9; contraction of the expansion mechanisms 102, 104, 106, 108 causes the irrigation system 10A to rise, as shown in FIG. 10.

For example, the expansion mechanisms 102, 104, 106, 108 may be telescoping links configured to change in length to permit the second ends 74A, 76A, 78A, 80A of the legs 42A, 44A, 46A, 48A of the towers 14A, 16A, 18A, 20A to move relative to one another. The expansion mechanisms 102, 104, 106, 108 may also be configured to maintain a current length and thereby hold the second ends 74A, 76A, 78A, 80A in a position relative to one another. The expansion mechanisms 102, 104, 106, 108 may use any technique, and/or include any apparatus, for maintaining its length. The expansion mechanisms 102, 104, 106, 108 may include electric actuators that drive locking mechanisms for holding the expansion mechanisms 102, 104, 106, 108 at their lengths. The expansion mechanisms 102, 104, 106, 108 may include hydraulic and/or pneumatic cylinders configured to enable free movement while also being able to hold a certain length. The control system 90A may be configured to direct the expansion mechanisms 102, 104, 106, 108 to permit movement of the legs 42A, 44A, 46A, 48A relative to one another. For example, the control system 90A may direct the expansion mechanisms 102, 104, 106, 108 to permit movement of the legs 42A, 44A, 46A, 48A when the control system 90A has determined a height adjustment of the irrigation system 10A is warranted. Once the height adjustment is made, the control system 90A may be configured to direct the expansion mechanisms 102, 104, 106, 108 to hold their current length.

The expansion mechanisms 102, 104, 106, 108 may additionally, or alternatively, be configured to apply a horizontal force on the legs 42A, 44A, 46A, 48A so that the legs 42A, 44A, 46A, 48A move relative to one another. The expansion mechanisms 102, 104, 106, 108 may use any technique, and/or apparatus, for causing the expansion mechanisms 102, 104, 106, 108 to lengthen or shorten. The expansion mechanism 102, 104, 106, 108 may include an electric actuator, a hydraulic cylinder, a pneumatic cylinder, a mechanical jack, or the like.

In some embodiments, the expansion mechanisms 102, 104, 106, 108 may be configured to only apply an expansion force for lowering the height of the irrigation system 10A, while merely permitting contraction when raising the height of the irrigation system 10A. In other embodiments, the expansion mechanisms 102, 104, 106, 108 may be configured to only apply a contraction force for raising the height of the irrigation system 10A, while merely permitting expansion when lowering the height of the irrigation system 10A.

The control system 90A may be configured to direct the motors 82A, 84A, 86A, 88A and the expansion mechanisms 102, 104, 106, 108 to synchronously work to move the legs 42A, 44A, 46A, 48A relative to one another. For example, the control system 90A may be configured to direct the motors 82A, 84A, 86A, 88A to drive the wheels 66A, 68A, 70A, 72A a certain direction so that the second ends 74A, 76A, 78A, 80A of the legs 42A, 44A, 46A, 48A move away from each other. The control system 90A may concurrently direct the expansion mechanisms 102, 104, 106, 108 either permit expansion or apply an expansion force to aid the motors 82A, 84A, 86A, 88A in moving the legs 42A, 44A, 46A, 48A apart. Additionally, the control system 90A may be configured to direct the motors 82A, 84A, 86A, 88A to drive the wheels 66A, 68A, 70A, 72A a certain direction so that the second ends 74A, 76A, 78A, 80A of the legs 42A, 44A, 46A, 48A move toward each other. The control system 90A may concurrently direct the expansion mechanisms 102, 104, 106, 108 to either permit contraction or apply a contraction force to aid the motors 82A, 84A, 86A, 88A in moving the legs 42A, 44A, 46A, 48A together. In some embodiments, the motors 82A, 84A, 86A, 88A may be configured to rotate freely as the expansion mechanisms 102, 104, 106, 108 apply a force in one or both directions.

In some embodiments, only one motor 82A, 84A, 86A, 88A on each tower 14A, 16A, 18A, 20A is used with the expansion mechanisms 102, 104, 106, 108 to raise or lower the irrigation system 10A. For example, the control system 90A may be configured to drive one of the motors 82A, 84A, 86A, 88A while the expansion mechanisms 102, 104, 106, 108 permit movement or apply a horizontal force.

Figure 11:
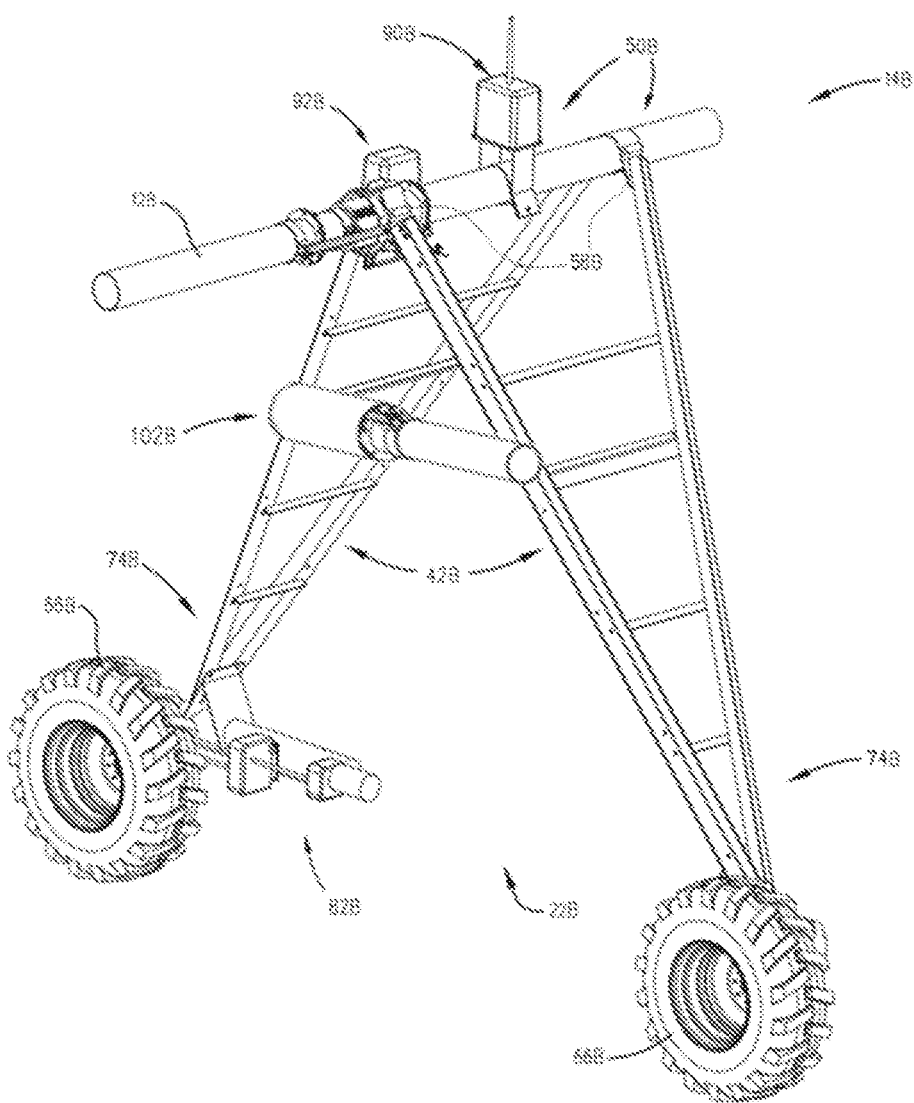
FIG. 11 is a front side perspective view of a mobile tower constructed in accordance with another embodiment of the invention.

A mobile tower 14B constructed in accordance with another embodiment of the invention is shown in FIG. 11.

The mobile tower 14B may comprise substantially similar components as mobile tower 14A; thus, the components of mobile tower 14B that correspond to similar components in mobile tower 14A have a 'B' appended to their reference numerals. The mobile tower 14B may include only one motor 82B for driving one of its wheels 66B. The motor 82B and expansion mechanism 102B may cooperatively raise or lower the height of the irrigation system, as discussed above.

However, it is foreseen that any number of configurations of a control system, motors, and expansion mechanisms may be used without departing from the scope of the present invention.

Figure 12:
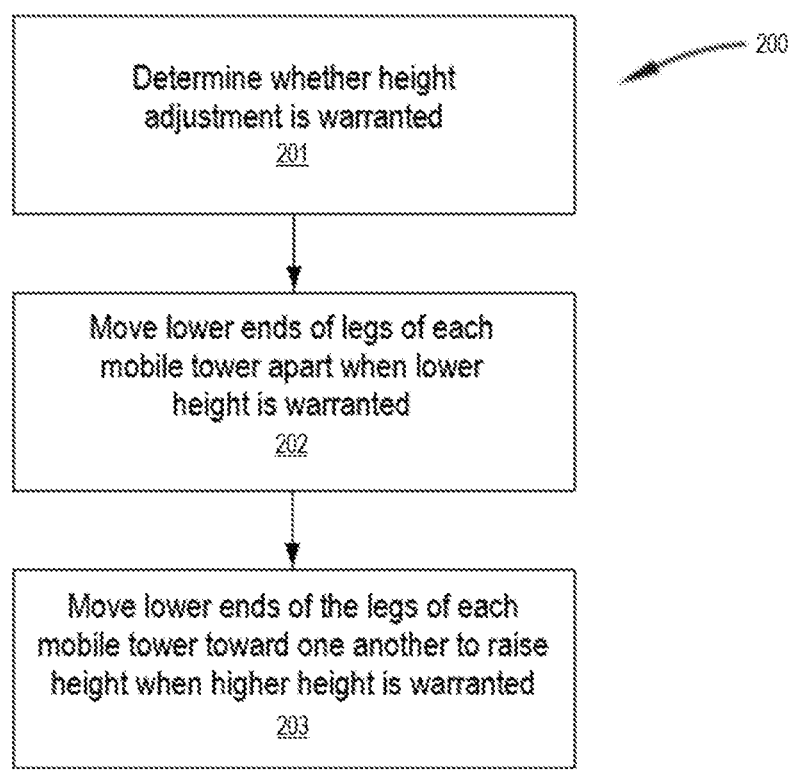
FIG. 12 is a flowchart illustrating at least a portion of the steps for adjusting a height of an irrigation system in accordance with an embodiment of the present invention.

The flow chart of FIG. 12 depicts the steps of an exemplary method 200 of adjusting a height of an irrigation system. In some alternative implementations, the functions noted in the various blocks may occur out of the order depicted in FIG. 12. For example, two blocks shown in succession in FIG. 12 may in fact be executed substantially concurrently, or the blocks may sometimes be executed in the reverse order depending upon the functionality involved. In addition, some steps may be optional. Some or all of the steps described below and illustrated in FIG. 12 may also represent executable code segments stored on the computer-readable medium described above and/or executable by the control system 90.

The method 200 is described below, for ease of reference, as being executed by exemplary devices and components introduced with the embodiments illustrated in FIGS. 1-11. For example, the steps of the method 200 may be performed by the irrigation system 10, the mobile towers 14, 16, 18, 20, the height-adjusting system 22, 24, 26, 28, and the control system 90 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 201, a height adjustment of an irrigation system is determined to be warranted. A control system may be configured to determine that the adjustment is warranted by receiving and/or analyzing data as discussed above. The data may be received from a data feed device, such as sensors (on-board or remote), a communication device, a user interface, etc., as discussed above. For example, the data may include receiving control signals from the user interface. The data may also include weather data received from a communication device. The data may be received from a distance-monitoring device and may include a vertical distance between a crop, and/or the ground, and the irrigation system. The data may be received from a wind sensor and include a wind speed. The data may also be received from a GPS system and may include GPS coordinate.

Referring to step 202, lower ends of legs of each mobile tower of the irrigation system are moved apart so as to lower the irrigation system when the determining step determines a lower height is warranted. The step of moving apart the lower ends of the legs may be performed using any combination of motors, height-adjusting systems, expansion mechanisms, etc., as discussed above.

The legs may be moved apart a distance according to pre-existing settings, an existence of control signals from a user interface, or based on the received data. Further, once the legs are moved apart at the desired distance, the distance between the legs may be held at that distance. The distance may be held using any combination of motors, height-adjusting systems, expansion mechanisms, etc., as discussed above.

Referring to step 203, the lower ends of the legs of each mobile tower of the irrigation system are moved toward one another so as to raise the irrigation system when the determining step determines a higher height is warranted. The step of moving the lower ends of the legs toward one another may be performed using any combination of motors, height-adjusting systems, expansion mechanisms, etc., as discussed above.

The legs may be moved toward one another to a distance according to pre-existing settings, an existence of control signals from a user interface, or based on the received data. Further, once the legs are moved toward one another at the desired distance, the distance between the legs may be held at that distance. The distance may be held using any combination of motors, height-adjusting systems, expansion mechanisms, etc., as discussed above.

The method 200 may include additional, less, or alternate steps and/or device(s), including those discussed elsewhere herein.

It will be appreciated that the height-adjusting system may be used with other types of irrigation systems without departing from the scope of the present invention. Further, the height-adjusting system may include any means for triggering a height adjustment instead of, or in addition to, the control system, such as a button or switch that activates the motors to move the legs relative to one another. The means for triggering the height-adjusting system may additionally or alternatively include a communication component for receiving instructions to activate the motors.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An irrigation system comprising:
a fluid-carrying conduit;
two or more spaced-apart mobile towers configured to support and move the conduit above
   a field, each mobile tower comprising
   a pair of legs, each leg having a first end coupled with the fluid-carrying conduit via a swivel connection and a second end,
   a wheel connected to each of the second ends of the legs,
   a motor for driving at least one of the wheels, and
   an expansion mechanism extending between the legs and comprising
     a first end connected to a first leg of the pair of legs,
     a second end extending horizontally from the first end and connected to a second leg of the pair of legs, and
     an actuator for horizontally extending and retracting the first end relative to the second end to adjust a horizontal distance between the wheels; and a control system in communication with the motor and having
- a user interface for receiving commands to raise or lower the irrigation system;
- a data feed device for receiving data including at least one of a wind speed, an air temperature, a crop temperature, GPS coordinates of the irrigation system, a vertical distance from the irrigation system to the field, a vertical distance from the irrigation system to a crop, a weather forecast, and a humidity level; and
- a processing element configured to
  - receive the commands to raise or lower the irrigation system from the user interface,
  - receive the data from the data feed device,
  - analyze the data,
  - direct the expansion mechanism of each mobile tower to extend or retract the first end relative to the second end, and
  - direct the motors to move the at least one of the wheels of each mobile tower synchronously with the expansion mechanisms to adjust horizontal distances between the wheels of each mobile tower to raise or lower the irrigation system.

2. An irrigation system comprising:
a fluid-carrying conduit;
two or more spaced-apart mobile towers configured to support and move the conduit above a field, each mobile tower comprising
- a pair of legs, each of the pair of legs having a first end connected to the fluid-carrying conduit and a second end opposite to the first end, the first end of at least one of the pair of legs being swivably connected to the fluid-carrying conduit via a swivel connection,
- a pair of ground-engaging wheels connected to the second ends of the legs,
- a motor for driving at least one of the wheels, and
- an expansion mechanism extending between the legs and comprising
  - a first end connected to a first leg of the pair of legs,
  - a second end extending from the first end of the expansion mechanism and connected to a second leg of the pair of legs, and
  - an actuator for shifting the first end and the second between a locked state in which the first end and the second of the expansion mechanism cannot move relative to one another and an unlocked state in which the first end may horizontally extend and retract relative to the second end to allow a change in horizontal distance between the wheels; and
- a control system in communication with the motor of each mobile tower and configured to
  - direct the expansion mechanism to shift from the locked state to the unlocked state, and
  - direct the motor of each mobile tower to operate synchronously so that a distance between the wheels of each of the pair of legs changes to raise or lower the irrigation system.

3. The irrigation system of claim 2, wherein the swivel connection is a first swivel connection, further comprising a second a swivel connection connecting the first end of the other leg of the pair of legs and the conduit.

4. The irrigation system of claim 2, further comprising a data feed device in communication with the control system and configured to receive data representative of environmental information, wherein the control system is configured to
- receive a signal representative of the data from the data feed device, and
- direct the motor of each mobile tower to operate to raise or lower the irrigation system based at least in part on the data.

5. The irrigation system of claim 4, wherein the data feed device comprises at least one of a distance-monitoring device, a humidity sensor, a wind sensor, a temperature sensor, a GPS unit, a communication device, or an accelerometer.

6. The irrigation system of claim 4, further comprising a user interface configured to receive a selection representative of an instruction to adjust a height of the irrigation system, wherein the control system is configured to
- receive a signal representative of the instruction from the user interface, and
- direct the motor of each mobile tower to operate to raise or lower the irrigation system based at least in part on the instruction.

* * * * *